(12) United States Patent
Clune et al.

(10) Patent No.: US 7,217,119 B2
(45) Date of Patent: May 15, 2007

(54) FASTENER MOLDING

(75) Inventors: William P. Clune, Hillsborough, NH (US); Mark A. Clarner, Concord, NH (US)

(73) Assignee: Velcro Industries B.V., Curacao (AN)

(*) Notice: Subject to any disclaimer, the term of this patent is extended or adjusted under 35 U.S.C. 154(b) by 182 days.

(21) Appl. No.: 11/131,780

(22) Filed: May 18, 2005

(65) Prior Publication Data

US 2006/0263463 A1 Nov. 23, 2006

(51) Int. Cl.
B29C 43/46 (2006.01)
(52) U.S. Cl. ................................ 425/471; 425/363
(58) Field of Classification Search ................ 425/115, 425/363, 471
See application file for complete search history.

(56) References Cited

U.S. PATENT DOCUMENTS

| | | | | |
|---|---|---|---|---|
| 3,312,583 A | * | 4/1967 | Rochlis | 425/373 |
| 3,752,619 A | * | 8/1973 | Menzin et al. | 425/134 |
| 4,775,310 A | * | 10/1988 | Fischer | 425/363 |
| 4,794,028 A | | 12/1988 | Fischer | |
| 5,800,845 A | * | 9/1998 | Akeno et al. | 425/224 |
| 5,875,527 A | | 3/1999 | Lacey et al. | |
| 5,900,350 A | | 5/1999 | Dowd et al. | |
| 5,922,222 A | | 7/1999 | Jens et al. | |
| 5,971,738 A | | 10/1999 | Jens et al. | |
| 5,980,230 A | | 11/1999 | Buzzell et al. | |
| 6,039,556 A | | 3/2000 | Jens et al. | |
| 6,099,289 A | | 8/2000 | Jens et al. | |
| 6,162,040 A | * | 12/2000 | Clune | 425/363 |
| 6,163,939 A | | 12/2000 | Lacey et al. | |
| 6,202,260 B1 | | 3/2001 | Clune et al. | |
| 6,258,311 B1 | | 7/2001 | Jens et al. | |
| 6,280,670 B1 | | 8/2001 | Buzzell et al. | |
| 6,533,981 B1 | | 3/2003 | Jens et al. | |
| 6,640,348 B1 | | 11/2003 | Provost et al. | |
| 2002/0022108 A1 | | 2/2002 | Krantz et al. | |
| 2003/0012921 A1 | | 1/2003 | Gallant et al. | |
| 2003/0034583 A1 | | 2/2003 | Provost | |

FOREIGN PATENT DOCUMENTS

EP 1042971 A1 11/2000

OTHER PUBLICATIONS

Search Report and Written Opinion; mailed Sep. 9, 2006; PCT/US2006/019199.

* cited by examiner

*Primary Examiner*—James P. Mackey
(74) *Attorney, Agent, or Firm*—Fish & Richardson P.C.

(57) ABSTRACT

The invention relates to fastener molding. In one aspect, a molding apparatus for forming a sheet-form fastener product includes a first ring defining a plurality of voids extending inwardly from a circumferential surface of the ring. The voids are circumferentially spaced apart from one another by portions of the ring including recessed regions that partially define molding cavities. The molding apparatus also includes multiple plug members configured to be disposed within the voids. The plug members and the portions of the ring therebetween cooperate to define the molding cavities when the plug members are disposed within the voids. The molding cavities are shaped to mold, from molten resin forced into the molding cavities from a peripheral surface of the molding apparatus, an array of fastener elements having overhanging heads for releasable engagement with a mating fastener product.

28 Claims, 7 Drawing Sheets

FASTENER MOLDING

TECHNICAL FIELD

This invention relates to fastener molding.

BACKGROUND

Fastener products, such as hook components of hook-and-loop fasteners, or other projections for releasable engagement into a cooperating material, can be manufactured by a continuous molding method employing a mold roll that has fastener-shaped mold cavities formed in its periphery. The mold roll can be formed of an axially compressed stack of ring-form mold plates. In operation, molten polymer from an extruder can be introduced into a pressure nip to force the molten polymer under high pressure into the fastener cavities of the mold roll to mold fastener elements (e.g., hooks or stems). At the same time, the mold roll can form a sheet-form base from which the fastener elements extend.

SUMMARY

In one aspect, the invention features a molding apparatus for forming a sheet-form fastener product. The molding apparatus includes a first ring defining a plurality of voids extending inwardly from a circumferential surface of the ring. The voids are circumferentially spaced apart from one another by portions of the ring including recessed regions that partially define molding cavities. The molding apparatus also includes a plurality of plug members configured to be disposed within the voids. The plug members and the portions of the ring therebetween cooperate to define the molding cavities when the plug members are disposed within the voids. The molding cavities are shaped to mold, from molten resin forced into the molding cavities from a peripheral surface of the molding apparatus, an array of fastener elements having overhanging heads for releasable engagement with a mating fastener product.

In some embodiments, the plug members include recesses that, together with the recessed portions of the ring, define the molding cavities.

In some embodiments, at least some of the molding cavities are shaped to mold fastener elements having crook portions. In certain embodiments, at least some of the molding cavities are oriented to mold fastener element crooks that extend in a direction across a width of the ring.

In some embodiments, at least some of the plug members each partially define two molding cavities. In certain embodiments, at least some of the molding cavities are partially defined by end surfaces of the plug members, and others of the molding cavities are partially defined by side surfaces of the plug members. In some embodiments, the end surfaces of the plug members are configured to cooperate with a surface of an adjacent ring to define at least some of the molding cavities.

In certain embodiments, the plug members include portions of a second ring, and the plug members are disposed within the voids when the second ring is positioned adjacent and concentric with the first ring. In some embodiments, at least some of the plug members integrally extend from a first side surface of the second ring. In certain embodiments, the second ring further includes plug members extending from a second side surface thereof to fill voids of a third ring to define other molding cavities. In some embodiments, the molding apparatus includes multiple such first rings and second rings arranged adjacent one another in an alternating pattern. In certain embodiments, the multiple rings are positioned about an inner member and axially compressed to form a substantially cylindrical molding roll.

In some embodiments, the molding apparatus further includes a second ring configured to be positioned adjacent the first ring. In certain embodiments, the plug members cooperate with the second ring, when positioned adjacent the first ring, to define additional molding cavities. In some embodiments, the plug members include recessed regions that partially define the additional molding cavities. In certain embodiments, the second ring comprises a plurality of recessed regions that partially define the additional molding cavities.

In some embodiments, the molding apparatus further includes a second ring defining a plurality of voids extending inwardly from a circumferential surface of the ring. The voids are circumferentially spaced apart from one another by portions of the ring having recessed regions. The second ring is configured to be positioned adjacent the first ring such that the recessed regions of the first and second rings cooperate to partially define molding cavities.

In certain embodiments, the void and plug members have matching tapers.

In some embodiments, the plug members are press-fitted within the voids.

In certain embodiments, the voids and the plug members have substantially rectangular cross-sections.

In some embodiments, the voids extend from a first side of the ring to a second side of the ring.

In another aspect, the invention features a molding apparatus for forming a sheet-form fastener product, which includes a first ring defining a plurality of voids extending inwardly from a circumferential surface of the first ring, and a second ring including multiple plug members extending from the second ring. The plug members define recessed regions and are configured to be disposed within the voids. The plug members and at least one surface of the first ring cooperate to define molding cavities when the plug members are disposed within the voids. The molding cavities are shaped to mold, from molten resin forced into the molding cavities from a peripheral surface of the molding apparatus, an array of fastener elements having overhanging heads for releasable engagement with a mating fastener product.

In some embodiments, at least some of the molding cavities are shaped to mold fastener elements having crook portions. In certain embodiments, at least some of the molding cavities are oriented to mold fastener element crooks that extend in a direction across a width of the ring.

In some embodiments, at least some of the plug members extend from a first side surface of the second ring. In certain embodiments, at least some of the plug members extend from a second side surface of the second ring, the second side surface being opposite the first side surface.

In some embodiments, the molding apparatus comprises multiple such first rings and second rings arranged adjacent one another in an alternating pattern. In certain embodiments, the multiple rings are positioned about an inner member and axially compressed to form a substantially cylindrical molding roll.

In an additional aspect, the invention features a method of making a molding apparatus, which includes forming a groove in a side surface of a first ring. The groove extends inwardly from the side surface of the ring and from a circumferential surface of the ring. The method further includes removing material from circumferentially spaced apart regions of the first ring to form voids that extend inwardly from the circumferential surface of the ring. The regions from which the material is removed extend from at least a top region of the groove to a bottom region of the groove such that a portion of the groove extends through portions of the ring between the circumferentially spaced apart voids, such that each of the ring portions between the voids defines a recessed region. The method also includes disposing plug members within the voids of the ring. The plug members and the portions of the ring between the voids cooperate to define molding cavities.

In some embodiments, forming the groove in the side surface of the ring involves machining the side surface of the ring.

In certain embodiments, removing the material from circumferentially spaced apart regions of the ring includes wire electrical discharge machining the circumferentially spaced apart regions of the ring.

In some embodiments, the groove, prior to removing the material from the circumferentially spaced apart regions of the first ring, extends substantially continuously around the ring.

In certain embodiments, at least some of the plug members each partially define two molding cavities.

In some embodiments, the method further includes disposing a second ring adjacent the first ring. The second ring cooperates with side surfaces of the plug members to define at least some of the molding cavities. In certain embodiments, the method further includes arranging multiple such first and second rings adjacent one another in an alternating pattern.

In some embodiments, disposing the plug members within the voids involves press-fitting the plug members within the voids.

In certain embodiments, at least some of the plug members extend from a side surface of a second ring adjacent the first ring.

In some embodiments, at least some of the molding cavities are shaped to mold fastener elements having crook portions.

In some embodiments, the method further includes disposing a second ring adjacent the first ring. The second ring defines multiple voids extending inwardly from a circumferential surface of the ring. The voids are circumferentially spaced apart from one another by portions of the ring that include recessed regions that partially define molding cavities. In certain embodiments, the method further includes aligning the recessed regions of the first and second rings such that the recessed regions of the first and second rings cooperate to define molding cavities. In some embodiments, aligning the recessed regions of the first and second regions includes aligning features of the first and second rings with an alignment feature on a mandrel as the rings are positioned about the mandrel.

In a further aspect, the invention features a method of producing a fastener product having a multiplicity of fastener elements extending from a base, which includes providing a rotating mold roll including a plurality of first rings arranged in a stack. Each of the first rings defines multiple voids that extend inwardly from a circumferential surface of the roll. The voids are circumferentially spaced apart from one another by portions of the ring that include recessed regions that partially define molding cavities. The mold roll also includes multiple plug members disposed within the voids. The plug members cooperate with the portions of the ring between the voids to define the molding cavities. The method further includes introducing molten resin to a circumferential surface of the roll and forcing some of the resin into the molding cavities under pressure, thereby molding an array of fastener elements integrally with resin disposed at the circumferential surface of the molding apparatus. The method then includes stripping the resin from the mold roll to expose the multiple fastener elements extending from the base.

In some embodiments, the plug members are disposed within the voids by arranging second rings between adjacent first rings. The plug members extend from side surfaces of the second rings.

In certain embodiments, the plug members are disposed within the voids by press-fitting the plug members into the voids.

In some embodiments, the resin is introduced into a nip defined by the molding apparatus and an adjacent pressure device.

In certain embodiments, the pressure device includes a counter-rotating pressure roll.

In some embodiments, each of the fastener elements includes an engageable head overhanging the base. In certain embodiments, the fastener elements include hooks. In some embodiments, at least some of the fastener elements each have a loop-engageable crook extending laterally across the base.

Other features and advantages are in the description, the drawings, and the claims.

DESCRIPTION OF DRAWINGS

Like reference symbols in the various drawings indicate like elements.

DETAILED DESCRIPTION

Molding Apparatus

Figure 1:
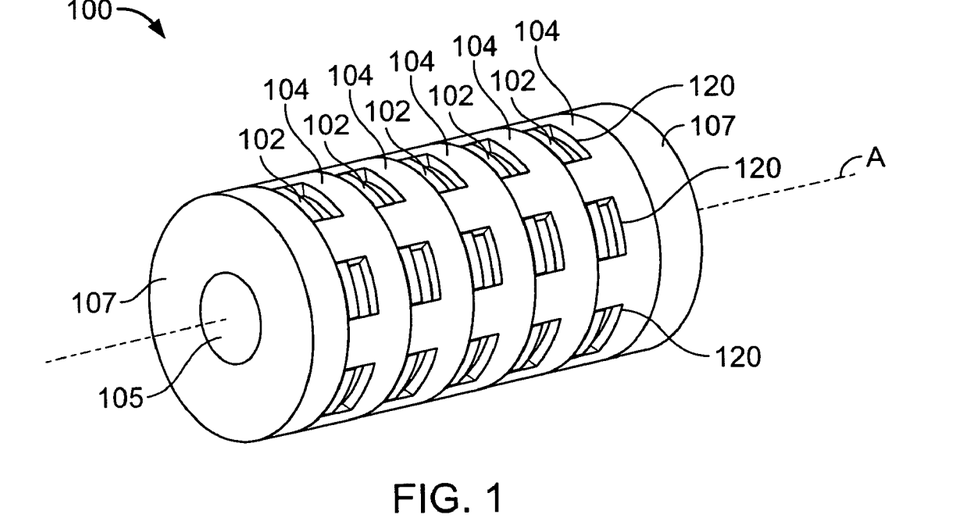
FIG. 1 is a perspective view of an embodiment of a molding device.

Referring to FIG. 1, a mold roll 100 includes multiple female rings 102 and multiple male rings 104 disposed about a mandrel 105. Female and male rings 102 and 104 are axially compressed between end rings 107. Male and female rings 102 and 104, as described below, cooperate to define multiple fastener-shaped (e.g., hook-shaped) molding cavities 120. Consequently, mold roll 100 can be used to mold fastener products that include multiple fastener elements (e.g., hook-shaped fastener elements). For example, as described in more detail below, molten polymer resin can be introduced at high pressure to the peripheral surface of mold roll 100 so that some of the molten resin enters molding cavities 120 to mold fastener elements, while the remaining portion of the molten resin is pressed against the peripheral surface of mold roll 100 to form a resin base from which the molded fastener elements extend.

Figure 2:
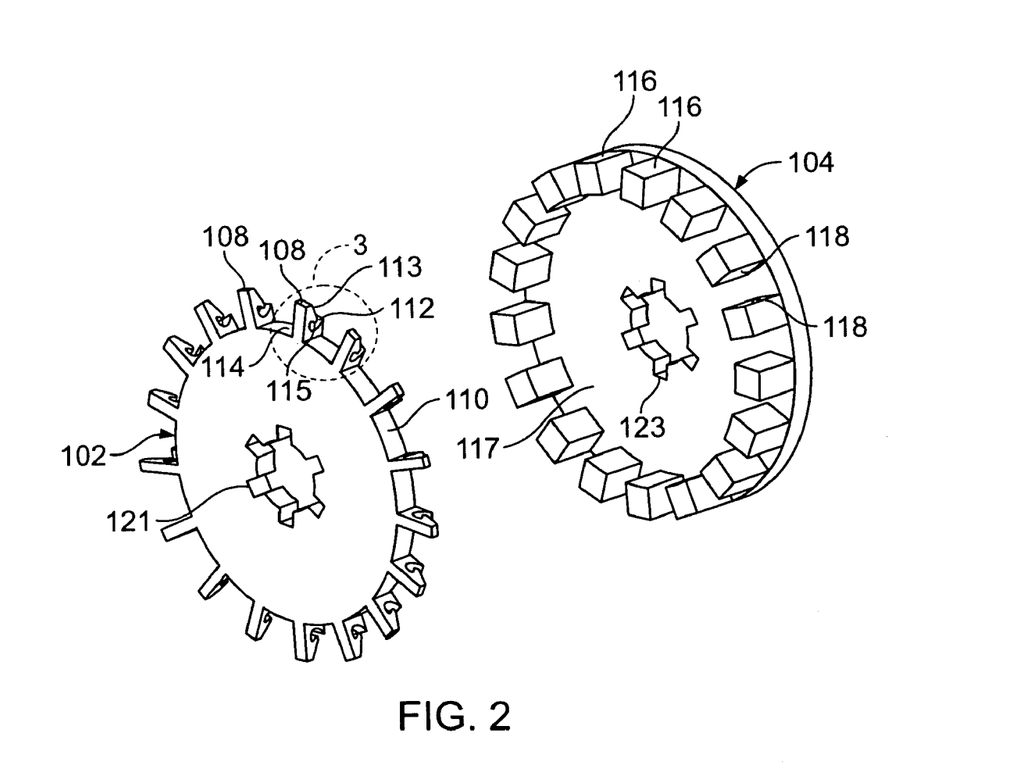
FIG. 2 is a partial exploded view of the molding device of FIG. 1.

FIG. 2 shows an exploded view of a portion of molding device 100, which includes one of female rings 102 and one of male rings 104. Female ring 102 includes multiple, circumferentially spaced apart members 108 that extend outwardly from a peripheral surface 110 of an inner portion of the ring. Members 108 have top surfaces that help to define the circumferential surface of mold roll 100, when assembled. Members 108 can have a width $w_m$ ranging from about 0.1 millimeter to about 1.3 millimeters (e.g., about 0.25 millimeter to about 0.6 millimeter). Members 108 include recessed portions 112 that span the width of members 108, and are shaped to partially define molding cavities 120. Recessed portions 112 include stem portions 113 and crook portions 115, which can mold stem and crook portions, respectively, of hook-shaped fastener elements. Members 108 can be spaced apart about the circumference of female ring 102 by a distance of about 0.15 millimeter to about one millimeter (e.g., about 0.25 millimeter to about 0.5 millimeter). In some embodiments, members 108 are substantially uniformly spaced apart along the circumference of female ring 102. However, members 108 can alternatively or additionally be spaced apart by non-uniform distances.

Figure 3:
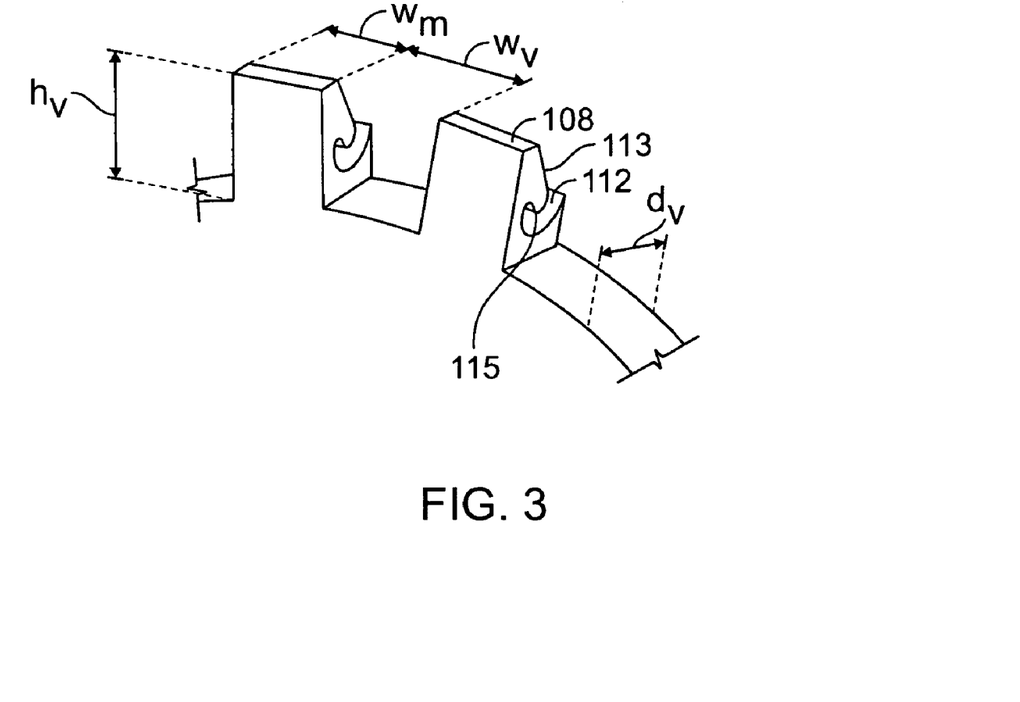
FIG. 3 is an enlarged view of region 3 in FIG. 2.

Voids 114 are defined between each of the adjacent members 108 of female ring 102. As shown in FIGS. 2 and 3, voids 114 extend from one side of female ring 102 to an opposite side of female ring 102. In certain embodiments, voids 114 are narrow relative to the diameter of mold roll. For example, voids 114 can have a width $w_v$ of about 0.15 millimeter to about one millimeter (e.g., about 0.25 millimeter to about 0.5 millimeter). Voids 114 generally have a height $h_v$ and a depth $d_v$ that are slightly greater (e.g., about 0.01 millimeter to about 0.04 millimeter greater) than the height and depth of recessed portions 112. Height $h_v$ of voids 114 can range from about 0.2 millimeter to about 1.3 millimeters (e.g., about 0.4 millimeter to about 0.9 millimeter) and depth $d_v$ of voids 114 can range from about 0.3 millimeters to about six millimeters (e.g., about 0.5 millimeter to about 2.5 millimeters).

Male ring 104, as shown in FIG. 2, includes multiple circumferentially spaced apart plugs 116 extending from a side surface 117. The dimensions of plugs 116 generally roughly correspond to the dimensions of voids 114. In certain embodiments, the spaces between plugs 116 and the surfaces defining voids 114 (e.g., the side surfaces of members 108), when plugs 116 are retained within voids 114, as described below, are sufficiently small to prevent resin from entering those spaces during the molding process. In some embodiments, the width, height, and/or depth of plugs 116 are slightly less (e.g., about 0.01 millimeter to about 0.04 millimeter less) than width $w_v$, height $h_v$, and/or depth $d_v$ of voids 114. Plugs 116 can, for example, have a height of about 0.16 millimeter to about 1.3 millimeter, a width of about 0.11 millimeters to about one millimeter, and/or a depth of about 0.26 millimeter to about 1.4 millimeter.

When mold roll 100 is assembled, as shown in FIG. 1, plugs 116 of male ring 104 are positioned (e.g., retained) within voids 114 of female ring 102. The top surfaces of plugs 116 are generally substantially aligned with the circumferential surface of female ring 102 (e.g., with the top surfaces of members 108) when positioned within voids 114. This can, for example, allow mold roll 102 to form a fastener product having a substantially flat or uniform base from which fastener elements extend. The other surfaces of plugs 116 can similarly mate with corresponding surfaces of voids 114.

Any of various suitable techniques can be used to retain plugs 116 within voids 114. In certain embodiments, as noted above, female and male rings 102 and 104 are stacked about mandrel 105 and axially compressed between end rings 107. The inner diameters of rings 102 and 104 can include slots 121 and 123 that mate with projections extending from the outer diameter of mandrel 105 to help align plugs 116 with voids 114. The axial compression of rings 102 and 104 can help to axially retain plugs 116 within voids 114, and contact between the outer diameter of mandrel 105 and the inner diameters of rings 102 and 104 can help to radially retain plugs 116 within voids 114.

Plugs 116 can have substantially flat side surfaces 118 (e.g., side surfaces with no recessed regions) that extend in a direction parallel to the axis of rotation A of mold roll 100. Consequently, when male ring 104 is mated with female roll 102 (e.g., when plugs 116 are retained within voids 114), side surfaces 118 of plugs 116 and side surface 117 of ring 104 can cooperate with members 108 to define molding cavities 120 (FIG. 1) having substantially flat sides. In some embodiments, the side surfaces of plugs 116 extend substantially perpendicularly to the circumferential surface of ring 102. In certain embodiments, side surfaces 118 extend in a direction substantially perpendicular from the circumferential surface of ring 104. In such embodiments, mold roll 102 can be used to form fastener elements that extend substantially perpendicularly from a resin base. In certain embodiments, the side surfaces of plugs 116 extend at an acute angle relative to the circumferential surface of ring 104. In such embodiments, mold roll 100 can be used to mold fastener elements with sides that extend at an acute angle relative to a resin base. The fastener elements can, for example, have sides that taper outwardly to form a lower base region that is wider than the upper crook portion.

Figure 5:
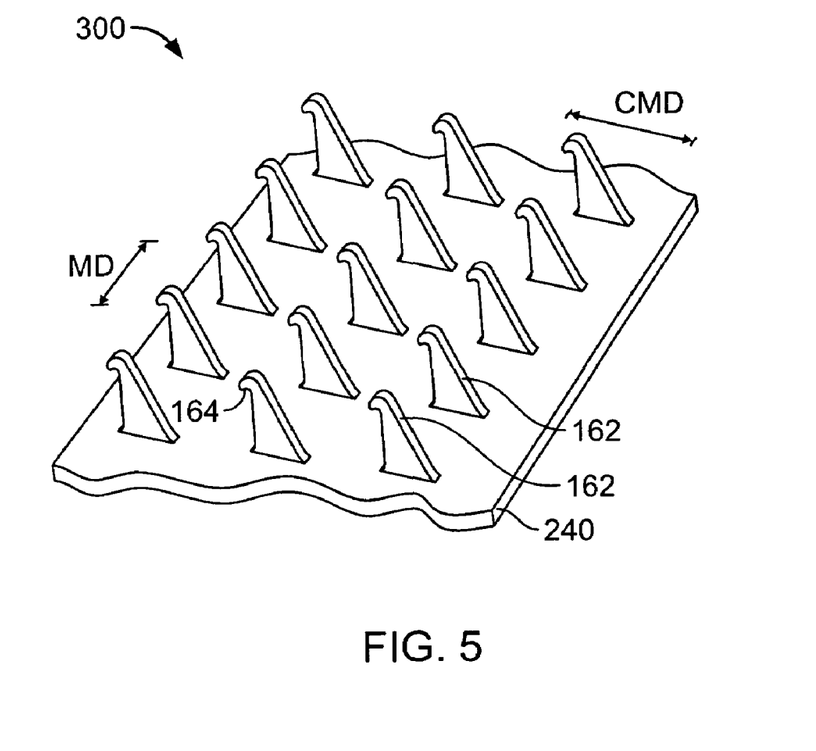
FIG. 5 is a perspective view of an embodiment of a fastener product.

The crook portions of molding cavities 120 are aligned in a transverse direction of mold roll 100 (e.g., in a transverse direction of rings 102 and 104). This allows for molding of fastener elements 162 having crook portions extending (e.g., from rear to front) in a cross-machine direction CMD (i.e., transverse to mold roll 100 and perpendicular to the machine direction MD), as shown in FIG. 5. Such orientation can be useful for resisting loads applied to the fastener product in the cross-machine direction, such as when the fastener product (e.g., fastener tape) is secured across a diaper tab.

Molding cavities 120 are arranged such that all of crook portions 140 extend in the same direction. As a result, the fastener elements formed in molding cavities 120 include crook portions 164 extending in the same direction. This type of fastener product provides very little peel and shear resistance in one direction and a great deal of peel and shear resistance in the opposite direction. Molding cavities 120 can alternatively or additionally be arranged such that many (e.g., half) of the crook portions face in opposite directions to mold a fastener product that can, for example, provide substantially equal peel and shear resistance in opposite directions.

Method of Manufacture

A method of making mold roll 100 generally includes forming female rings 102 and male rings 104, and then assembling female rings 102 and male rings 104 about mandrel 105, as described above. Forming each of female rings 102 includes providing a ring having a substantially uniform thickness, and machining a hook-shaped groove in a side surface of the ring. The groove extends inwardly from a circumferential surface of the ring. A crook portion of the hook-shaped groove generally extends in a transverse direction of the ring (e.g., across a portion of the thickness of the ring). In certain embodiments, the groove extends continuously (e.g., uninterruptedly) around the circumference of the ring. Any of various machining techniques can be used to form the groove. In certain embodiments, the groove is formed using a lathe. The groove can alternatively or additionally be created using any of various other techniques, such as, milling, laser etching, and/or photo etching techniques.

After forming the groove in the side surface of the ring, material can be removed from the ring to form voids 114 and members 108. Material can, for example, be removed from the circumferential surface of the ring inwardly to a region below the lowermost portion of the groove (e.g., below the crook portion of the groove). Voids 114 can have a width and depth such that substantially the entire cross-sectional area of the groove extending through members 108 is exposed at voids 114. Voids 114 can be created within rings using any of various suitable material removal techniques. Examples of such techniques include wire EDM, plunge EDM, micro machining, laser cutting, and photo etching.

Male ring 104 can be formed by providing a ring of substantially uniform thickness, and removing material from a side surface of the ring to form plugs 116 extending from the side surface of the ring. For example, material can be removed from substantially all portions of the side surface except those regions where plugs 116 are desired. Any of various material removal techniques can be used to remove material from the ring. Examples of such techniques include wire EDM, plunge EDM, micro machining, laser cutting, photo etching, and chemical etching. As an alternative to or in addition to the process described above for forming male ring 104, pre-formed plugs can be attached to a side surface of the substantially uniform ring to form male ring 104. The pre-formed plugs can, for example, be formed using any of various molding, casting, or machining techniques prior to being attached to the ring. The preformed plugs can be attached to the side of the ring using any of various suitable techniques, such as welding, bonding, and/or adhesive attachment techniques. Alternatively or additionally, material can be applied to the side surface of ring 104 using any of various techniques, such as electroplating techniques, to form plugs 116.

After forming female and male rings 102 and 104, the rings are stacked about mandrel 105 such that plugs 116 mate with voids 114. Female and male rings 102 and 104 are then axially compressed between end rings 107. The axial compression force can help to ensure that plugs 116 are securely retained within voids 114.

Method of Use

Figure 4:
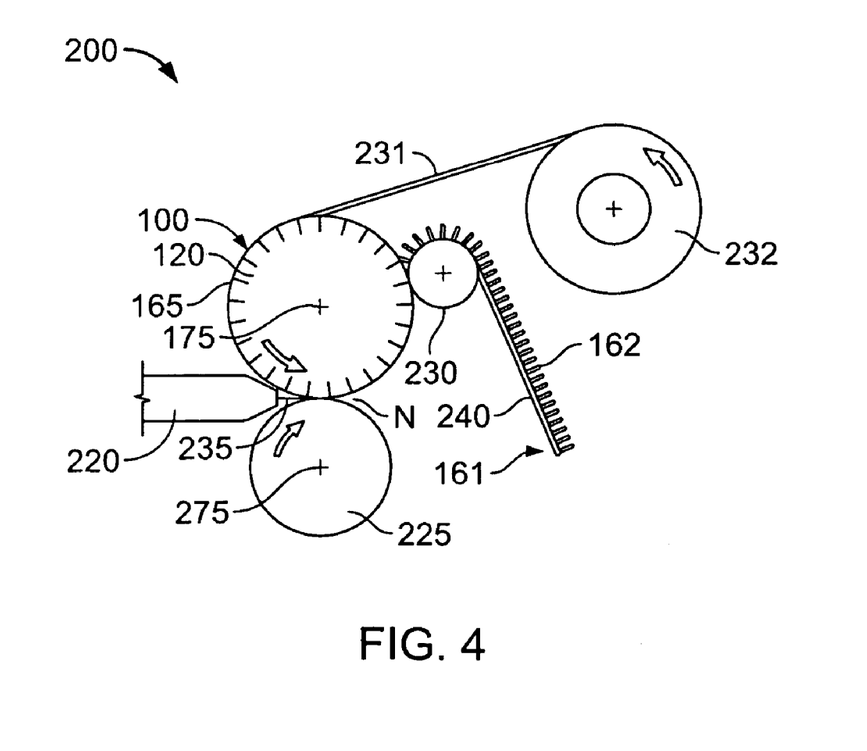
FIG. 4 illustrates an embodiment of a method and apparatus for forming fastener products.

Referring to FIG. 4, an apparatus 200 for making fastener products includes mold roll 100, an extruder 220, a pressure roll 225, a stripping roll 230, and a sheet-form material 231. During use, sheet-form material 231 is held in tension between a roll 232 of sheet-from material 231, mold roll 100, and stripping roll 230. Sheet-form material 231 may be comprised of one or more of several suitable materials. For example, sheet-form material 231 may be a loop material, a non-woven fabric, a reinforcing scrim, a porous material, paper, or foam.

Mold roll 100 is positioned adjacent pressure roll 225 such that their axes of rotation 175 and 275 are substantially parallel to one another. A nip N is created between circumferential surface 165 of molding device 100 and an adjacent surface of pressure roll 225. Molding device 100 and pressure roll 225 rotate counter to one another, which creates a large amount of pressure within nip N.

Extruder 220 extrudes a molten resin 235 into nip N where it meets sheet-form material 231. Molten resin 235 may comprise one or more of various thermoplastics and other resins. A high density polyethylene, such as Exxon Mobil #6908, can be used for some applications. Other suitable materials include low density polyethylene (LDPE), polypropylene, and nylon, for example.

As sheet-form material 231 and molten resin 235 are conveyed through nip N, the high nip pressure forces some of the molten resin 235 into molding cavities 120 to mold an array of fastener elements, while the remainder of molten resin 235 is compressed between circumferential surface 165 of mold roll 100 and an adjacent surface of pressure roll 225 to form a resin base 240 from which fastener elements 162 extend. The high nip pressure can also bond resin base 240 to sheet-form material 231. Alternatively or additionally, other suitable attachment methods may be used to attach resin base 240 to sheet-form material 231. For example, a heat-sensitive adhesive may be applied to one side of sheet-form material 231 and heat may be applied, at a later time, to resin base 240 and/or sheet-form material 231 in order to adhesively bond resin base 240 to sheet-form material 231.

After molten resin 235 has been forced into molding cavities 120, the resin is allowed to cool and harden within molding cavities 120. Mold roll 100 and pressure roll 225 may be internally cooled by liquid (e.g., water) to facilitate the cooling of molten resin 235. After cooling and hardening, resin 235 has a shape permanently corresponding to the shape of molding cavities 120. For example, molten resin 235 can be in the shape of fastener hooks.

Sheet-form material 231 and the resin carried thereon are then conveyed along mold roll 100 toward stripping roll 230. Sheet-form material 231 and the resin thereon are conveyed around stripping roll 230, causing some of fastener elements 162, which have been allowed to cool and harden, to be stripped from molding cavities 120. At this point, a fastener product sheet 161 having an array of fastener elements 162 extending from resin base 240 is exposed. Fastener product sheet 161 can then be separated (e.g., cut, slit, and/or punched) to form multiple discrete fastener products 300 (FIG. 5).

As shown in FIG. 5, the resulting fastener product 300 includes multiple rows of fastener elements 162 integrally extending from resin base 240. Crook portions 164 of fastener elements 162 can be designed to engage with corresponding fastener elements (not shown) in order to provide peel and shear resistance. The corresponding fastener elements may be comprised of any material susceptible to engagement with crook portions 164. Commonly used materials, for example, include loop material, non-woven fabric, and self-engaging hooks.

Figure 6:
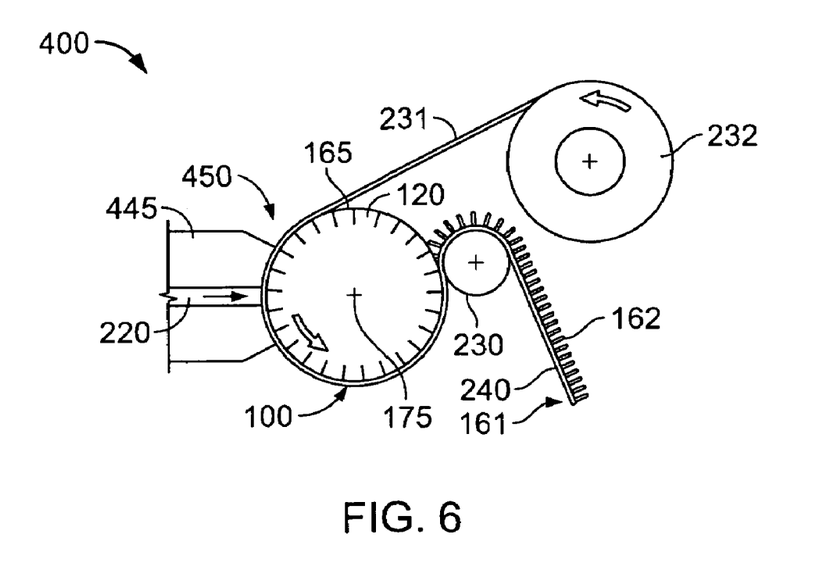
FIG. 6 illustrates another embodiment of a method and apparatus for forming fastener products.

Referring to FIG. 6, an alternative apparatus 400 for producing fastener product 300 includes molding device 100, extruder 220, an extruder housing 445, stripping roll 230, and sheet-form material 231. Extruder housing 445 is disposed around extruder 220. Extruder housing 445 is arcuate-shaped to define a predetermined gap 450 between extruder housing 445 and circumferential surface 165 of mold roll 100. Molten resin 235 is extruded through extruder 220 and into gap 450.

In this embodiment, sheet-form material 231 is preferably a porous material. As sheet-form material 231 is conveyed around molding device 100, extruder 220 forces molten resin 235 both onto and through sheet-form material 231. Due to the porosity of sheet-form material 231, some of resin 235 passes through sheet-form material 231 and into molding cavities 120 to form fastener elements 162, while the remainder of resin 235 adheres to sheet-form material 231 to form resin base 240 from which fastener elements 162 extend. Molten resin 235 is allowed to cool and harden before being stripped out of molding cavities 120 by stripping roll 230 to expose a newly formed fastener product sheet 161 having fastener elements 162 extending from resin base 240. The fastener product sheet 161 can then be cut to form discrete fastener products similar to fastener product 300 shown in FIG. 5.

OTHER EMBODIMENTS

While certain embodiments have been described above, other embodiments are possible.

As an example, in some embodiments, plugs 116 include recessed regions that partially define molding cavities 120. For example, side surfaces of plugs 116 can include recessed regions that align with recessed regions 112 of members 108 when the plugs are positioned within voids 114. The recessed regions of plugs 116 can cooperate with recessed regions 112 of members 108 to define molding cavities 120.

Figure 7:
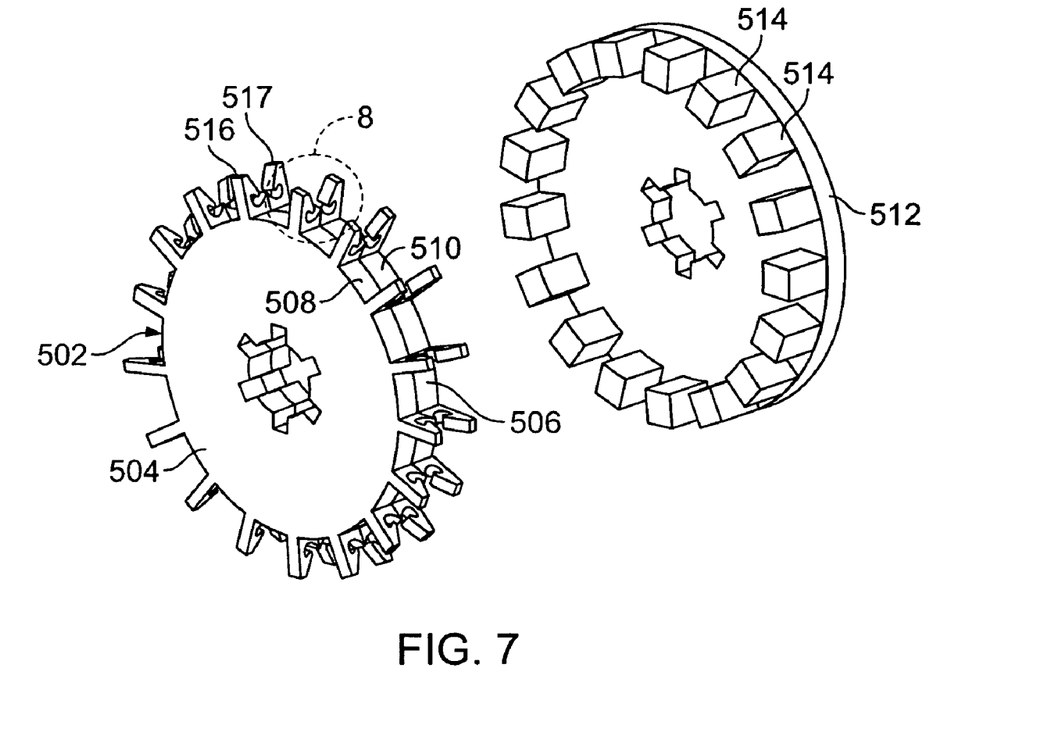
FIG. 7 is a partial exploded view of an embodiment of a molding device.
Figure 8:
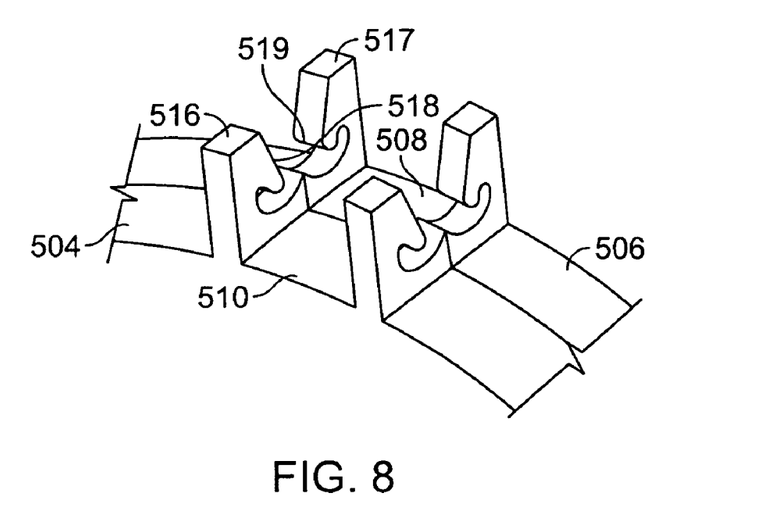
FIG. 8 is an enlarged view of region 8 in FIG. 7.

As another example, while the molding cavities and fastener elements of the embodiments above have been described as being hook-shaped, the molding cavities and fastener elements can alternatively or additionally be any of various other shapes. The molding cavities can, for example, be shaped to mold palm tree-shaped fastener elements, mushroom-shaped fastener elements, and/or stems. As shown in FIGS. 7 and 8, for example, a female ring assembly 502 includes two female rings 504 and 506 that define voids 508 and 510, respectively. Female rings 504 and 506 are similar (e.g., identical) to female ring 102. For example, each of rings 504 and 506 include members 516 and 517 extending from circumferential surfaces of inner portions of the rings. Members 516 and 517 include recessed portions 518 and 519, which partially define molding cavities. Rings 504 and 506 can be positioned adjacent one another, as shown in FIG. 8, so that recessed portions 518 and 519 of the adjacent rings are aligned with one another to partially define a palm tree shaped molding cavity. An adjacent male ring 512 includes plugs 514 extending from its side surface. Upon positioning plugs 514 of male ring 512 within voids 508 and 510, plugs 514 cooperate with members 516 and 517 to completely define the palm tree shaped molding cavities. Multiple male and female rings can be stacked together to form a mold roll similar to the mold rolls described above. The resulting mold roll can be used to form fastener products in a manner similar to the processes described above.

Figure 9:
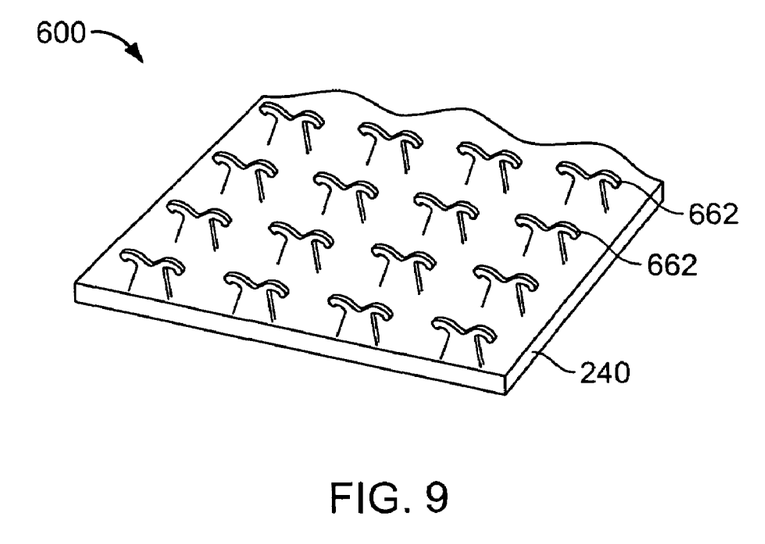
FIG. 9 is a perspective view of an embodiment of a fastener product.

FIG. 9 shows a fastener product 600 that can be formed using the above-described mold roll. Fastener product 600 includes multiple rows of palm tree shaped fastener elements 662 extending from resin base 240. The crook portions of the fastener elements extend substantially in the cross-machine direction. Due to this arrangement, fastener product 600 can provide shear and peel resistance to forces applied in either transverse direction of the fastener product (e.g., from left to right or right to left).

Figure 10:
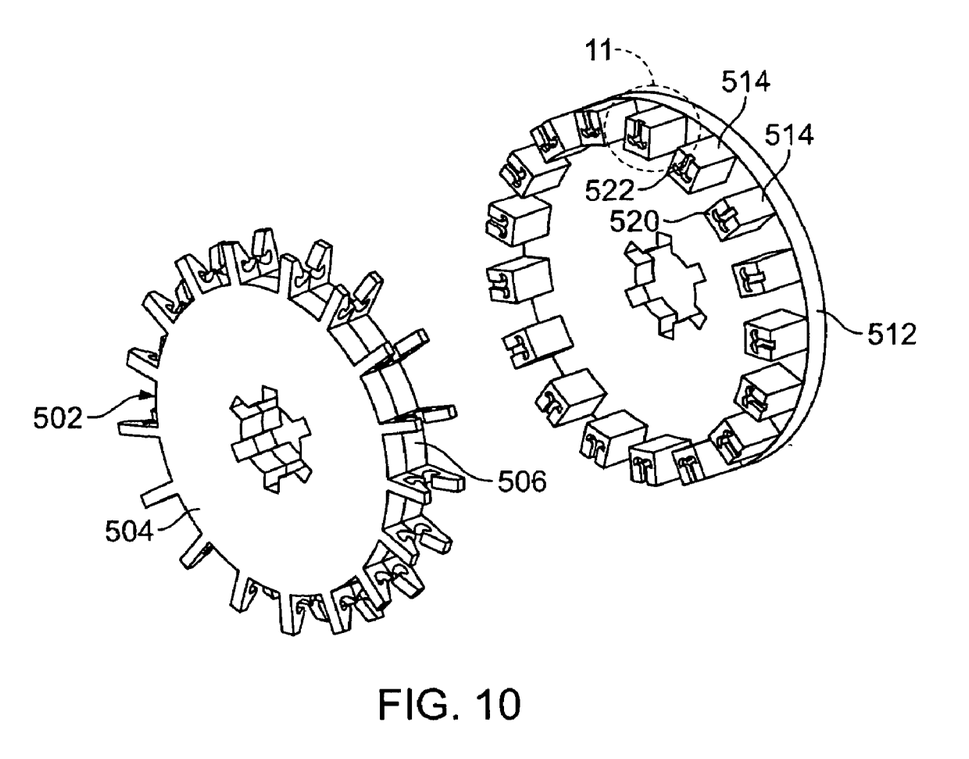
FIG. 10 is a partial exploded view of another embodiment of a molding device.
Figure 11:
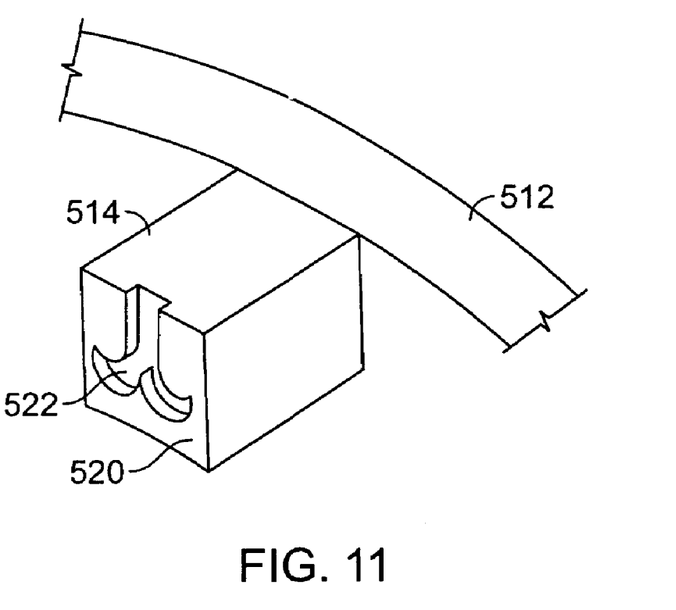
FIG. 11 is an enlarged view of region 11 in FIG. 10.

As a further example, in some embodiments, plugs of the male rings include recessed regions that partially define additional molding cavities. As shown in FIGS. 10 and 11, for example, end surfaces 520 of plugs 514 include recessed regions 522 that partially define molding cavities. When plugs 514 are positioned within voids 508 and 510, the recessed region of end surface 520 can abut a side surface of an adjacent ring 104 to completely define the additional molding cavities. For example, a flat side of another male ring 512 (e.g., the side of the male ring opposite the plugs) can abut the end surfaces of plugs 514 to define the molding cavities. Alternatively or additionally, a spacer ring can be positioned adjacent the end surfaces of plugs 514 to define the molding cavities. The spacer ring can, for example, be a ring with substantially flat side surfaces and a circumferential surface that is substantially equal to the circumferential surfaces of the male and female rings.

Figure 12:
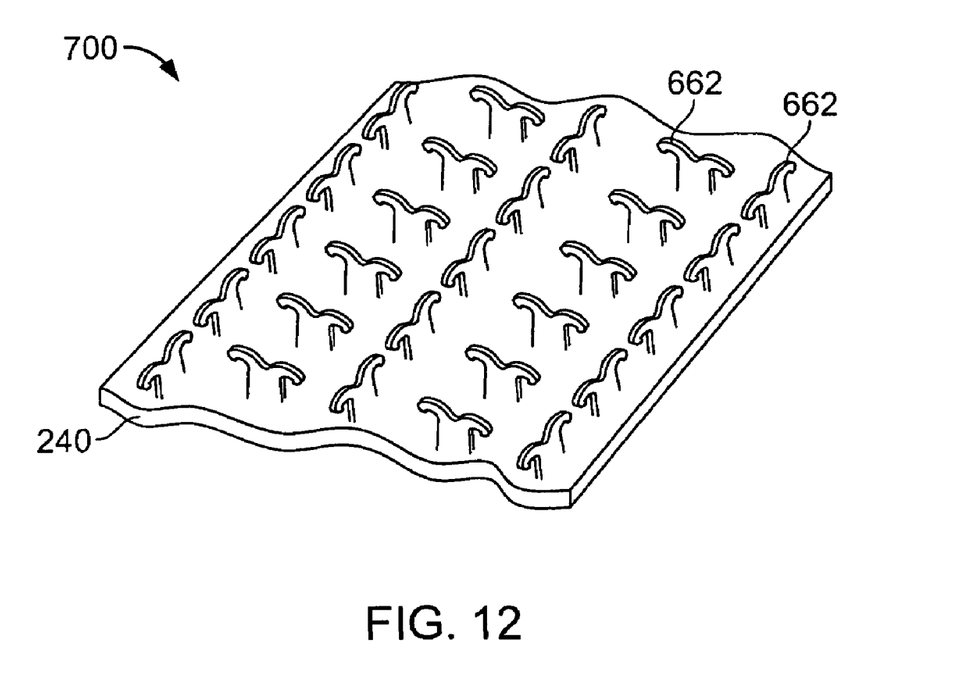
FIG. 12 is a perspective view of an embodiment of a fastener product.

The male and female rings can be arranged in a stack to form a mold roll with molding cavities having crook portions extending in the machine direction and cross-machine direction. As shown in FIG. 12, a fastener product 700, which can be formed using the above-described mold roll includes palm tree shaped fastener elements 662 extending from resin base 240. Some of the fastener elements have crook portions extending in the cross-machine direction, while other fastener elements have crook portions extending in the machine direction. As a result, fastener product 700 can provide shear and peel resistance to forces applied both along the machine direction and along the cross-machine direction.

As an additional example, in some embodiments, a ring includes recessed regions in its side wall that partially define molding cavities. For example, the male rings can include recessed portions in their side surfaces opposite the plugs. Alternatively or additionally, spacer rings can be formed with recessed portions in one or both of their side surfaces. The recessed portions of the rings can cooperate with a relatively flat surface of an adjacent ring or a relatively flat surface of a plug to define a molding cavity.

As another example, in certain embodiments, the male rings include plugs extending from both side walls. In such embodiments, female rings can be placed on either side of the male rings to define the molding cavities. Spacer rings can be provided between adjacent male rings where sides of plugs include recessed regions that partially define molding cavities.

Figure 13:
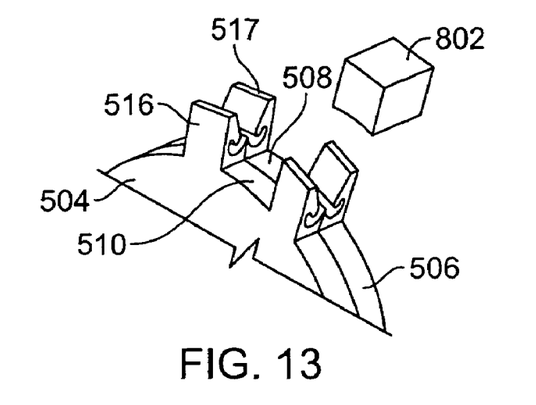
FIG. 13 is a partial exploded view of an embodiment of a molding device.

As another example, while the embodiments described above include plugs extending from a ring, the plugs can alternatively or additionally be discrete members. As shown in FIG. 13, for example, a plug 802 is substantially cubical. The discrete plugs can, for example, be retained within voids 508 and 510 between members 516 and 517 using press-fitting techniques. In certain embodiments, plugs 802 and members 516 and 517 include mating features that help to secure plugs 802 within voids 508 and 510. Plugs 802 can, for example, include members (e.g., ribs) (not shown) that extend from their side surfaces (e.g., from the surfaces that extend transversely across the rings when plugs 802 are positioned within voids 508 and 510). Members 508 and 510 can include slots (not shown) sized and shaped to receive the ribs of the plugs when the plugs are inserted into the voids via a side surface of the ring. The slots of members 508 and 510 can, for example, extend transversely across the ring. When the ribs of plugs 802 are inserted into the slots of members 508 and 510, plugs 802 can be prevented from radially escaping from voids 508 and 510. Any of various other retaining techniques can alternatively or additionally be used to help retain plugs 802 within voids 508 and 510. For example, the rings and plugs can be axially compressed and/or adhesive can be used to attach the plugs to the rings.

Figure 14:
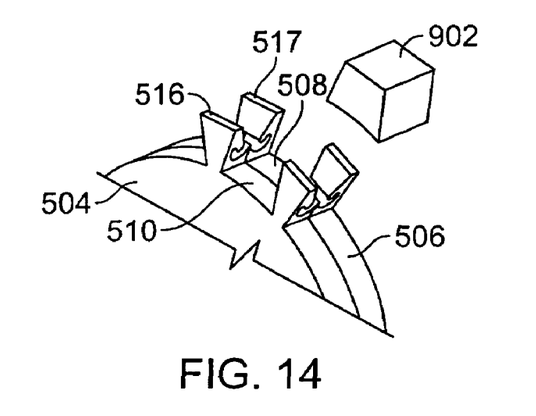
FIG. 14 is a partial exploded view of another embodiment of a molding device.

In certain embodiments, as shown in FIG. 14, plugs can be trapezoidal. Plug 902, for example, has a bottom region that is greater in width than the upper region (e.g., the region of the plug nearer the circumferential surface of the mold roll). Members 516 and 517 of rings 504 and 506 can similarly include upper regions that have a greater width than lower regions. Consequently, when plugs 902 are inserted into voids 508 and 510, the angled surfaces of the plugs can contact the angled surfaces of members 516 and 517 to retain the plugs within voids 508 and 510. Alternatively or additionally, plugs 902 may be held in place using any of the various techniques described above.

Figure 15:
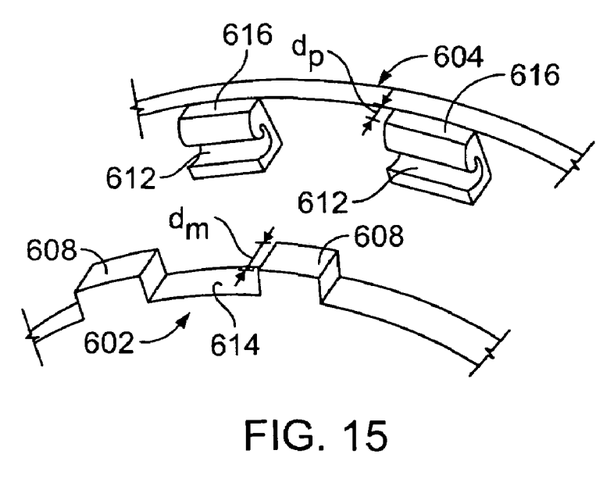
FIG. 15 is a partial exploded view of another embodiment of a molding device.

As a further example, while the female rings of the embodiments above have been described above as having circumferentially spaced apart members including recessed regions that partially define the molding cavities, in certain embodiments, the plugs of the male ring define the recessed regions that partially define the molding cavities. Referring to FIG. 15, for example, a mold roll includes a female ring 602 having multiple members 608 that extend outwardly from the peripheral surface of an inner portion of female ring 602. Members 608 are circumferentially spaced apart along the circumferential surface of female ring 602, forming voids 614 between them. A male ring 604 includes multiple plugs 616 extending from its side surface. Plugs 616 include recessed regions 612 that partially define molding cavities. In some embodiments, multiple male and female rings 602 and 604 are stacked in an alternating pattern about a mandrel to form a mold roll. In such embodiments, plugs 616 of male ring 604 are positioned within voids 614 of female ring 602. Plugs 616 cooperate with members 608 and a side wall of an adjacent male ring to define the molding cavities of the mold roll. Alternatively or additionally, rings 602 and 604 can be configured using any of the various techniques described above to form the mold roll and molding cavities.

Members 608 and plugs 616 can have substantially equivalent heights such that they form an even peripheral surface of the mold roll. Members 608 can have a depth $d_m$ that is greater than a depth $d_p$ of an upper portion of plugs 616. In some embodiments, the depth $d_m$ of member 608 is about twice the depth $d_p$ of the upper portion of plugs 616. Consequently, when multiple rings are stacked and plugs 616 are positioned within members 608, resin can pass from the peripheral surface of the rings into recessed portions 612 to form the fastener elements. Plugs 616 and members 608 can also be sized and configured so that resin is substantially prevented from entering spaces between abutted surfaces (e.g., side surfaces) of plugs 616 and members 608 during the molding process. Plugs 616 can, for example, be positioned within voids 614 with tolerances within the range discussed above with respect to plugs 116 and voids 114.

As shown in FIG. 15, recessed regions 612 can be shaped to mold hook-shaped fastener elements. Alternatively or additionally, recessed regions 612 can be shaped to form any of various other types of fastener elements, such as, palm tree-shaped elements, mushroom-shaped elements, and stems. In some embodiments, multiple plugs (e.g., two, three, four or more plugs) can be inserted into each of the voids of the female ring. Each of the plugs can include recessed regions that, when the plugs are inserted within the voids, cooperate with recessed regions of the other plugs to define molding cavities. This can help to define molding cavities including crook portions that extend in multiple different directions. In certain embodiments, for example, plugs 616 can be inserted into voids 614 from both sides of female ring 602 such that recessed regions 612 of each of the plugs align and cooperate to define palm tree-shaped molding cavities.

Any of the various techniques described above with respect to plugs 116 can be used to form plugs 616. In some embodiments, material is removed from all regions of a side surface of a ring having a substantially uniform thickness except those regions in which plugs are desired. As a result, a ring having plugs integrally extending from its side surface can be produced. Alternatively or additionally, material can be applied to a ring of substantially uniform thickness to form plugs extending from a side surface of the ring. Material can be selectively removed from the plugs to form recessed regions 612. Recessed regions 612 can be formed using any of various material removal techniques, such as wire EDM, plunge EDM, micro machining, laser cutting, photo etching, and/or chemical etching. Examples of etching techniques are described in U.S. patent application Ser. No. 10/837,090, filed Apr. 30, 2004, and entitled "Etch Rate Control," which is incorporated by reference herein. Alternatively or additionally, recessed regions 612 can be formed by selectively applying material to plugs 616. Electroplating techniques can, for example, be used to apply material to desired regions of plugs 616 to form recessed regions 612. The material can be removed from and/or added to plugs 616 to form recessed regions of any desired shape.

The following are incorporated by reference herein in their entirety: U.S. Pat. No. 4,794,028 issued to Fisher; U.S. Pat. No. 5,971,738 issued to Jens et al.; and U.S. Pat. No. 6,202,260 issued to Clune et al.

Other embodiments are in the claims.

What is claimed is:

1. A molding apparatus for forming a sheet-form fastener product, the molding apparatus comprising:
    a first ring defining a plurality of voids extending inwardly from a circumferential surface of the ring, the voids being circumferentially spaced apart from one another by portions of the ring including recessed regions that partially define molding cavities; and
    a plurality of plug members configured to be disposed within the voids, the plug members and the portions of the ring therebetween cooperating to define the molding cavities when the plug members are disposed within the voids, the molding cavities being shaped to mold, from molten resin forced into the molding cavities from a peripheral surface of the molding apparatus, an array of fastener elements having overhanging heads for releasable engagement with a mating fastener product.

2. The molding apparatus of claim 1, wherein the plug members comprise recesses that, together with the recessed portions of the ring, define the molding cavities.

3. The molding apparatus of claim 1, wherein at least some of the molding cavities are shaped to mold fastener elements having crook portions.

4. The molding apparatus of claim 3, wherein at least some of the molding cavities are oriented to mold fastener element crooks that extend in a direction across a width of the ring.

5. The molding apparatus of claim 1, wherein at least some of the plug members each partially define two molding cavities.

6. The molding apparatus of claim 5, wherein at least some of the molding cavities are partially defined by end surfaces of the plug members, and others of the molding cavities are partially defined by side surfaces of the plug members.

7. The molding apparatus of claim 6, wherein the end surfaces of the plug members are configured to cooperate with a surface of an adjacent ring to define at least some of the molding cavities.

8. The molding apparatus of claim 1, wherein the plug members comprise portions of a second ring, the plug members being disposed within the voids when the second ring is positioned adjacent and concentric with the first ring.

9. The molding apparatus of claim 8, wherein at least some of the plug members integrally extend from a first side surface of the second ring.

10. The molding apparatus of claim 9, wherein the second ring further comprises plug members extending from a second side surface thereof to fill voids of a third ring to define other molding cavities.

11. The molding apparatus of claim 8, wherein the molding apparatus comprises multiple such first rings and second rings arranged adjacent one another in an alternating pattern.

12. The molding apparatus of claim 11, wherein the multiple rings are positioned about an inner member and axially compressed to form a substantially cylindrical molding roll.

13. The molding apparatus of claim 1, further comprising a second ring configured to be positioned adjacent the first ring.

14. The molding apparatus of claim 13, wherein the plug members cooperate with the second ring, when positioned adjacent the first ring, to define additional molding cavities.

15. The molding apparatus of claim 14, wherein the plug members comprise recessed regions that partially define the additional molding cavities.

16. The molding apparatus of claim 14, wherein the second ring comprises a plurality of recessed regions that partially define the additional molding cavities.

17. The molding apparatus of claim 1, further comprising a second ring defining a plurality of voids extending inwardly from a circumferential surface of the ring, the voids being circumferentially spaced apart from one another by portions of the ring having recessed regions, the second ring configured to be positioned adjacent the first ring such that the recessed regions of the first and second rings cooperate to partially define molding cavities.

18. The molding apparatus of claim 1, wherein the void and plug members have matching tapers.

19. The molding apparatus of claim 1, wherein the plug members are press-fitted within the voids.

20. The molding apparatus of claim 1, wherein the voids and the plug members have substantially rectangular cross-sections.

21. The molding apparatus of claim 1, wherein the voids extend from a first side of the ring to a second side of the ring.

22. A molding apparatus for forming a sheet-form fastener product, the molding apparatus comprising:

a first ring defining a plurality of voids extending inwardly from a circumferential surface of the first ring; and a second ring comprising a plurality of plug members extending from the second ring, the plug members defining recessed regions and being configured to be disposed within the voids, the plug members and at least one surface of the first ring cooperating to define molding cavities when the plug members are disposed within the voids, the molding cavities being shaped to mold, from molten resin forced into the molding cavities from a peripheral surface of the molding apparatus, an array of fastener elements having overhanging heads for releasable engagement with a mating fastener product.

23. The molding apparatus of claim 22, wherein at least some of the molding cavities are shaped to mold fastener elements having crook portions.

24. The molding apparatus of claim 23, wherein at least some of the molding cavities are oriented to mold fastener element crooks that extend in a direction across a width of the ring.

25. The molding apparatus of claim 22, wherein at least some of the plug members extend from a first side surface of the second ring.

26. The molding apparatus of claim 25, wherein at least some of the plug members extend from a second side surface of the second ring, the second side surface being opposite the first side surface.

27. The molding apparatus of claim 22, wherein the molding apparatus comprises multiple such first rings and second rings arranged adjacent one another in an alternating pattern.

28. The molding apparatus of claim 27, wherein the multiple rings are positioned about an inner member and axially compressed to form a substantially cylindrical molding roll.

* * * * *